US012038325B2

United States Patent
Kudo

(10) Patent No.: US 12,038,325 B2
(45) Date of Patent: Jul. 16, 2024

(54) OPTICAL FILTER, SPECTROMETRIC MODULE, AND SPECTRAL MEASUREMENT METHOD

(71) Applicant: Seiko Epson Corporation, Tokyo (JP)

(72) Inventor: Kei Kudo, Shiojiri (JP)

(73) Assignee: SEIKO EPSON CORPORATION (JP)

(*) Notice: Subject to any disclaimer, the term of this patent is extended or adjusted under 35 U.S.C. 154(b) by 77 days.

(21) Appl. No.: 17/482,512

(22) Filed: Sep. 23, 2021

(65) Prior Publication Data

US 2022/0090966 A1 Mar. 24, 2022

(30) Foreign Application Priority Data

Sep. 24, 2020 (JP) ................................. 2020-159699

(51) Int. Cl.
*G01J 3/28* (2006.01)
*G01J 3/02* (2006.01)
(Continued)

(52) U.S. Cl.
CPC ........... *G01J 3/2823* (2013.01); *G01J 3/0205* (2013.01); *G01J 3/06* (2013.01); *G01J 2003/1226* (2013.01)

(58) Field of Classification Search
CPC .......... G01J 3/2823; G01J 3/0205; G01J 3/06; G01J 2003/1226; G01J 3/2803; G01J 3/32;
(Continued)

(56) References Cited

U.S. PATENT DOCUMENTS

2006/0209413 A1* 9/2006 Kim .......................... G01J 3/26
359/577
2013/0311125 A1* 11/2013 Funamoto .............. G01N 21/59
702/104
(Continued)

FOREIGN PATENT DOCUMENTS

JP 2012-127917 A 7/2012
JP 2017-083314 A 5/2017
(Continued)

OTHER PUBLICATIONS

English Translation of JP-2018084460-A Description (Year: 2018).*

*Primary Examiner* — Tarifur R Chowdhury
*Assistant Examiner* — Akbar H. Rizvi
(74) *Attorney, Agent, or Firm* — Harness, Dickey & Pierce, P.L.C.

(57) ABSTRACT

An optical filter includes a variable wavelength interference filter including a pair of reflection films and having a plurality of transmission peak wavelengths according to the dimension of the gap between the pair of reflection films and a fixed wavelength filter disposed so as to face the variable wavelength interference filter and having a plurality of filter regions different from one another in transmission wavelength segment. The plurality of transmission peak wavelengths of the variable wavelength interference filter correspond to the transmission wavelength segments of the plurality of filter regions, respectively. The plurality of transmission peak wavelengths of the variable wavelength interference filter each change within the corresponding transmission wavelength segment of the plurality of filter regions in accordance with a change in the gap dimension.

5 Claims, 13 Drawing Sheets

(51) Int. Cl.
*G01J 3/06* (2006.01)
*G01J 3/12* (2006.01)

(58) Field of Classification Search
CPC ....... G01J 2003/1213; G01J 2003/2806; G01J 3/26; G01J 3/28; G02B 5/284
See application file for complete search history.

(56) References Cited

U.S. PATENT DOCUMENTS

| | | |
|---|---|---|
| 2014/0291522 A1 | 10/2014 | Tezuka et al. |
| 2017/0122807 A1 | 5/2017 | Kasahara et al. |
| 2018/0128682 A1* | 5/2018 | Nissim ...................... G01J 3/45 |
| 2018/0292261 A1* | 10/2018 | Learmonth ............ G01N 21/25 |
| 2019/0003889 A1 | 1/2019 | Kasahara et al. |
| 2019/0003890 A1 | 1/2019 | Kasahara et al. |
| 2019/0317258 A1* | 10/2019 | Zheng ....................... G01J 3/51 |
| 2020/0073033 A1* | 3/2020 | Baik ...................... G01J 3/0205 |
| 2020/0103721 A1* | 4/2020 | Matsuno .............. G02B 26/001 |
| 2020/0271516 A1* | 8/2020 | Enichlmair ............... G01J 3/26 |

FOREIGN PATENT DOCUMENTS

| | | | |
|---|---|---|---|
| JP | 2018084460 A | * | 5/2018 |
| JP | 2018-112750 A | | 7/2018 |
| WO | 2014-156018 A1 | | 10/2014 |

\* cited by examiner

OPTICAL FILTER, SPECTROMETRIC MODULE, AND SPECTRAL MEASUREMENT METHOD

The present application is based on, and claims priority from JP Application Serial Number 2020-159699, filed Sep. 24, 2020, the disclosure of which is hereby incorporated by reference herein in its entirety.

BACKGROUND

1. Technical Field

The present disclosure relates to an optical filter, a spectrometric module, and a spectral measurement method.

2. Related Art

There is a known variable wavelength interference filter that spectrally separates incident light and outputs light having a predetermined wavelength.

For example, the colorimetric sensor described in JP-A-2018-112750 includes a variable wavelength interference filter that transmits light having a wavelength according to the dimension of the gap between a pair of reflection films, a drive circuit that changes the dimension of the gap by changing a drive voltage applied to the variable wavelength interference filter, and an imaging section that performs imaging via the variable wavelength interference filter. In the colorimetric sensor, the dimension of the gap in the variable wavelength interference filter is successively changed, and the imaging is performed whenever the wavelength of the light passing through the variable wavelength interference filter is adjusted to each target wavelength. An optical spectrum associated with a measurement target can thus be measured.

In related art, such as JP-A-2018-112750 described above, however, the number of target wavelengths for the transmission wavelength of the variable wavelength interference filter is large in the measurement of a broadband or high-precision optical spectrum. The number of times by which the dimension of the gap in the variable wavelength interference filter is changed therefore undesirably increases, resulting in an increase in the measurement period.

SUMMARY

An optical filter according to one aspect of the present disclosure includes a variable wavelength interference filter including a pair of reflection films and having a plurality of transmission peak wavelengths according to a dimension of a gap between the pair of reflection films and a fixed wavelength filter disposed so as to face the variable wavelength interference filter and having a plurality of filter regions different from one another in transmission wavelength segment. The plurality of transmission peak wavelengths of the variable wavelength interference filter correspond to the transmission wavelength segments of the plurality of filter regions, respectively. The plurality of transmission peak wavelengths of the variable wavelength interference filter each change within a corresponding one of the transmission wavelength segments of the plurality of filter regions in accordance with a change in the gap dimension.

A spectrometric module according to one aspect of the present disclosure includes the optical filter described above and a plurality of light receivers disposed so as to face the plurality of respective filter regions of the fixed wavelength filter, and the plurality of light receivers each receive light passing through the variable wavelength interference filter and the filter region disposed so as to face the light receiver and output a light reception signal according to an intensity of the received light.

A spectral measurement method according to one aspect of the present disclosure is a spectral measurement method using an optical filter. The optical filter includes a variable wavelength interference filter, including a pair of reflection films, and having a plurality of transmission peak wavelengths according to a dimension of a gap between the pair of reflection films, and a fixed wavelength filter disposed so as to face the variable wavelength interference filter and having a plurality of filter regions different from one another in transmission wavelength segment. The plurality of transmission peak wavelengths of the variable wavelength interference filter corresponds to the transmission wavelength segments of the plurality of filter regions, respectively. The method includes (i) a scanning step of changing the gap dimension at predetermined intervals in such a way that the plurality of transmission peak wavelengths of the variable wavelength interference filter each change within a corresponding one of the transmission wavelength segments of the plurality of filter regions, (ii) a detection step of detecting light passing through the variable wavelength interference filter and the fixed wavelength filter for each of the filter regions during the scanning step.

DESCRIPTION OF EXEMPLARY EMBODIMENTS

First Embodiment

A first embodiment will be described below.

Figure 1:
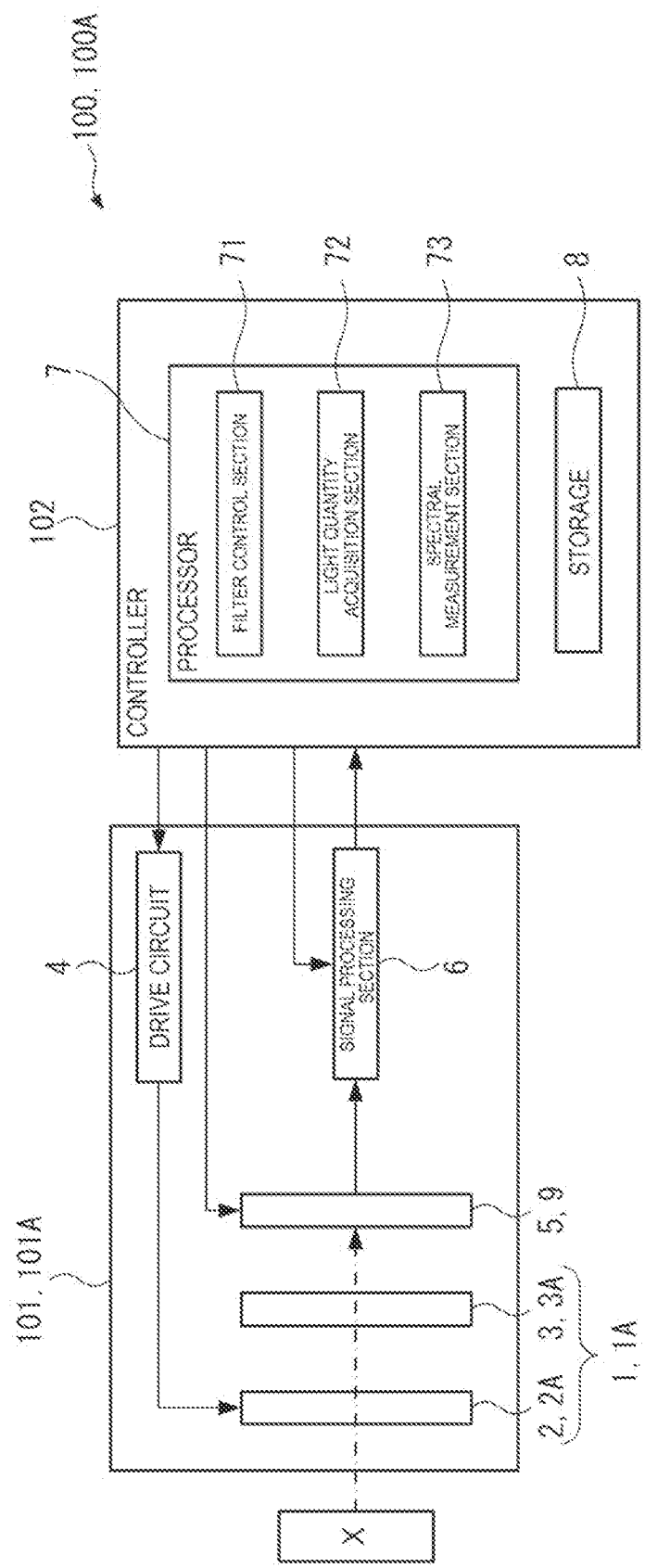
FIG. 1 is a diagrammatic view showing schematics of a spectrometric measurement apparatus according to a first embodiment and a second embodiment of the present disclosure.

FIG. 1 is a block diagram showing a schematic configuration of a spectral measurement apparatus 100 according to the present embodiment.

The spectral measurement apparatus 100 is an apparatus that analyzes the optical intensities at a plurality of wavelengths of measurement target light reflected off a measurement target object X to acquire an optical spectrum. The spectral measurement apparatus 100 includes a spectrometric module 101 and a controller 102, which controls the spectrometric module 101 and processes a signal outputted from the spectrometric module 101, as shown in FIG. 1.

Configuration of Spectrometric Module 101

The spectrometric module 101 according to the present embodiment includes a variable wavelength interference filter 2 and a fixed wavelength filter 3, which form an optical filter 1, a drive circuit 4, which drives the variable wavelength interference filter 2, a light receiving unit 5, which receives light having passed through the optical filter 1, and a signal processing section 6, which processes each light reception signal outputted from the light receiving unit 5.

The optical filter 1 according to the present embodiment includes the variable wavelength interference filter 2, which receives light out of the measurement target light reflected off the measurement target object X, and the fixed wavelength filter 3, which receives light having passed through the variable wavelength interference filter 2.

Figure 2:
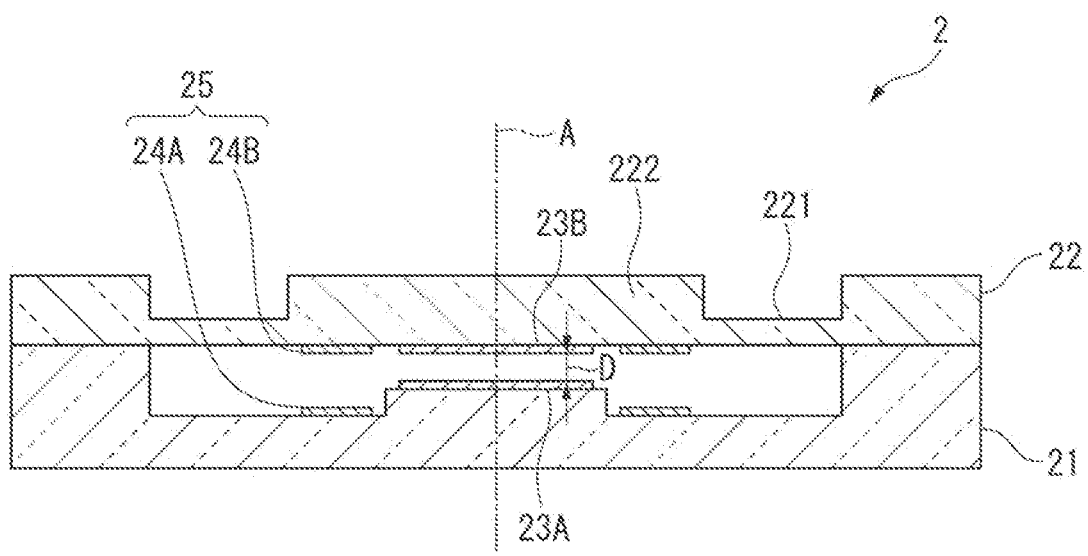
FIG. 2 is a cross-sectional view diagrammatically showing a variable wavelength interference filter in the first embodiment.

FIG. 2 is a cross-sectional view showing a schematic configuration of the variable wavelength interference filter 2.

The variable wavelength interference filter 2 is, for example, a variable wavelength Fabry-Perot etalon element. The configuration of the variable wavelength interference filter 2 will be briefly explained with reference to FIG. 2.

The variable wavelength interference filter 2 includes a first filter substrate 21 and a second filter substrate 22 disposed so as to be perpendicular to an optical axis A and face each other. The first filter substrate 21 is supported, for example, by a housing that is not shown. The second filter substrate 22 is provided with an annular diaphragm 221, and a portion of the second filter substrate 22 that is the portion surrounded by the diaphragm 221 forms a movable section 222. The second filter substrate 22 is supported by the first filter substrate 21 in a region outside the diaphragm 221.

A reflection film 23A and an electrode 24A are provided at the first filter substrate 21, and a reflection film 23B and an electrode 24B are provided at the movable section 222 of the second filter substrate 22.

The reflection films 23A and 23B are each formed, for example, of a metal film or a dielectric multilayer film. The reflection films 23A and 23B form a pair and are disposed so as to face each other with a gap therebetween. FIG. 2 shows the dimension of the gap (gap dimension D) between the reflection films 23A and 23B.

The electrodes 24A and 24B are disposed so as to face each other in a region around the reflection films 23A and 23B and together form an electrostatic actuator 25. The electrodes 24A and 24B are electrically coupled to the drive circuit 4.

In the variable wavelength interference filter 2, when a drive voltage is applied to the electrostatic actuator 25, electrostatic attraction occurs between the electrodes 24A and 24B of the electrostatic actuator 25, displacing the movable section 222 toward the first filter substrate 21. The gap dimension D thus changes. The variable wavelength interference filter 2 exhibits a transmission wavelength characteristic according to the gap dimension D.

Figure 3:
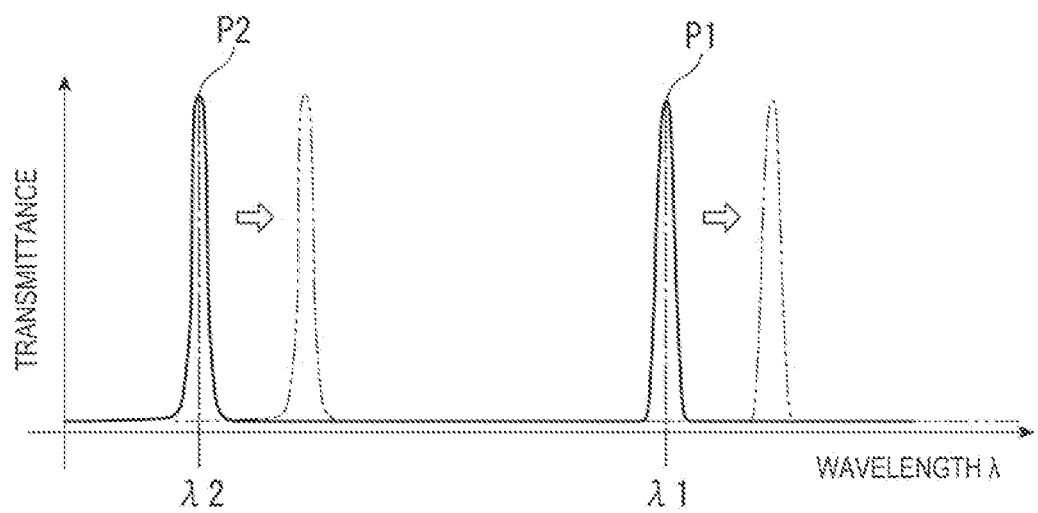
FIG. 3 shows a graph illustrating the transmission wavelength characteristic of the variable wavelength interference filter in the first embodiment.

FIG. 3 shows a graph illustrating the transmission wavelength characteristic of the variable wavelength interference filter 2. The transmission wavelength characteristic of the variable wavelength interference filter 2 has a plurality of peaks P1 and P2 (two peaks in the present embodiment), as shown in FIG. 3. That is, the variable wavelength interference filter 2 can transmit light having peak wavelengths $\lambda 1$ and $\lambda 2$ and therearound in such a way that the transmitted light has high wavelength resolution.

When the gap dimension D of the gap in the variable wavelength interference filter 2 increases, the peak wavelengths $\lambda 1$ and $\lambda 2$ shift as a whole to longer wavelengths, as indicated by the arrows in FIG. 3. On the other hand, when the gap dimension D decreases, the peak wavelengths $\lambda 1$ and $\lambda 2$ shift as a whole to shorter wavelengths.

Hereinafter, the peak wavelength $\lambda 1$, which is the longer wavelength, is referred to as a first transmission peak wavelength $\lambda 1$, and the peak wavelength $\lambda 2$, which is the shorter wavelength, is referred to as a second transmission peak wavelength $\lambda 2$.

The aforementioned transmission wavelength characteristic of the variable wavelength interference filter 2 can be achieved by adjusting the thickness of the metal film or the dielectric multilayer film that forms each of the reflection films 23A and 23B or the number of layers of each of the metal film or the dielectric multilayer film. A specific method for forming the variable wavelength interference filter 2 can, be found in JP 2019-128417.

Figure 4:
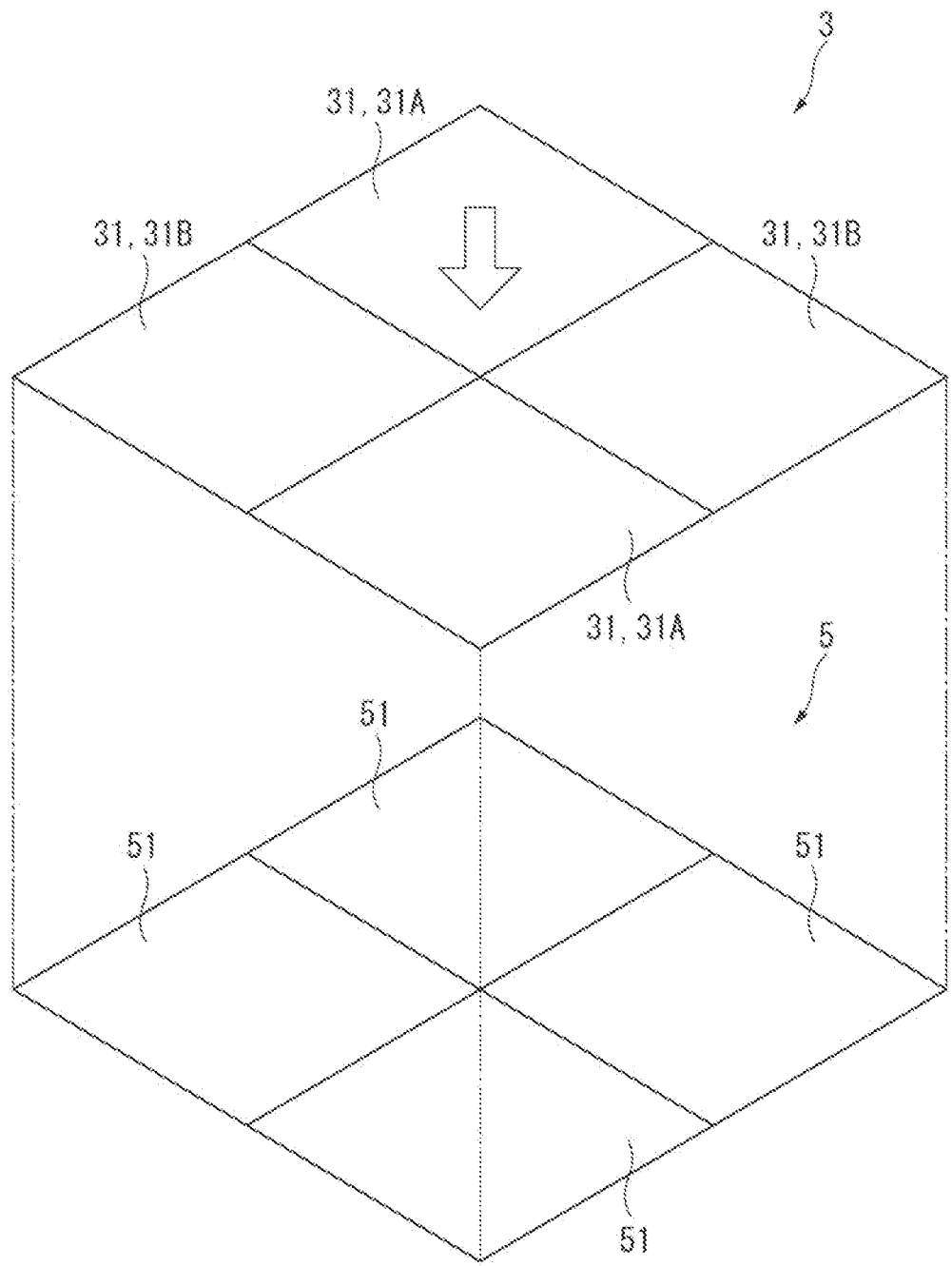
FIG. 4 diagrammatically shows a fixed wavelength filter and a light receiving unit in the first embodiment.

FIG. 4 diagrammatically shows the fixed wavelength filter 3 in the present embodiment and the light receiving unit 5 described later. The fixed wavelength filter 3 is disposed so as to face the variable wavelength interference filter 2 described above. The light having passed through the variable wavelength interference filter 2 travels toward the fixed wavelength filter 3, and the light having passed through the fixed wavelength filter 3 is received by the light receiving unit 5.

The fixed wavelength filter 3 in the present embodiment has a plurality of filter regions 31, as shown in FIG. 4. The plurality of filter regions 31 include a first filter region 31A and a second filter region 31B, which differ from each other in transmission wavelength segment.

FIG. 4 shows an example in which the plurality of filter regions 31 include two first filter regions 31A and two second filter regions 31B, but the number of first filter regions 31A and the number of second filter regions 31B can each be greater than or equal to one. The arrangement of the first filter regions 31A and the second filter regions 31B is not limited to the arrangement shown in FIG. 4 by way of example.

Figure 5:
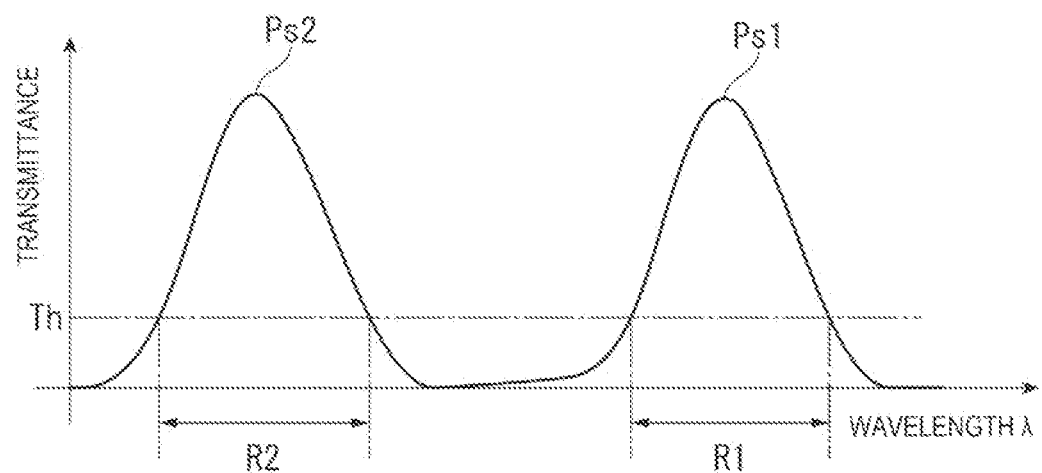
FIG. 5 shows a graph illustrating the transmission wavelength characteristic of the fixed wavelength filter in the first embodiment.

FIG. 5 shows a graph illustrating the transmission wavelength characteristic of the fixed wavelength filter 3 in the present embodiment. The transmission wavelength characteristic of the fixed wavelength filter 3 has a peak Ps1 corresponding to the first filter regions 31A and a peak Ps2 corresponding to the second filter regions 31B, as shown in FIG. 5.

The full width at half maximum of each of the peaks Ps1 and Ps2 in the transmission wavelength characteristic of the fixed wavelength filter 3 is wider than the full width at half maximum of each of the peaks P1 and P2 in the transmission wavelength characteristic of the variable wavelength interference filter 2.

The thus configured first filter regions 31A and second filter regions 31B are each formed by stacking, for example, dielectric multilayers on a transparent substrate.

In the present embodiment, the transmission wavelength segment of the first filter regions 31A is a wavelength segment in which the wavelength at the peak Ps1 is a transmission center wavelength and the transmittance is greater than or equal to a predetermined value Th. The transmission wavelength segment of the first filter regions 31A is set as a first target wavelength segment R1, which is a wavelength region used for measurement.

Similarly, the transmission wavelength segment of the second filter regions 31B is a wavelength segment in which the wavelength at the peak Ps2 is a transmission center wavelength and the transmittance is greater than or equal to the predetermined value Th. The transmission wavelength segment of the second filter regions 31B is set as a second target wavelength segment R2, which is a wavelength region used for measurement.

In the present embodiment, the first target wavelength segment R1 has longer wavelengths than those in the second target wavelength segment R2. The predetermined value Th can be arbitrarily set based, for example, on the sensitivity of light receivers 51.

The drive circuit 4 in FIG. 1 drives the electrostatic actuator 25 of the variable wavelength interference filter 2 under the control performed by the controller 102. That is, the drive circuit 4 inputs a drive voltage according to a target value of the gap dimension D to the electrostatic actuator 25 of the variable wavelength interference filter 2 to change the gap dimension D to the target value.

Although not described in detail in the present embodiment, the optical filter 1 may include a detector that detects the gap dimension D of the gap in the variable wavelength interference filter 2. In this case, the drive circuit 4 may perform feedback control on the drive voltage to be inputted to the electrostatic actuator 25 in such a way that the gap dimension D detected by the detector becomes the target value.

The light receiving unit 5 includes a plurality of light receivers 51, as shown in FIG. 4. The light receivers are disposed so as to face the filter regions 31. The light receivers 51 can each be, for example, a photodiode or a CMOS sensor.

Out of the plurality of light receivers 51, the light receivers 51 disposed so as to face the first filter regions 31A receive the light having passed through the variable wavelength interference filter 2 and the first filter regions 31A and each output a light reception signal according to the optical intensity of the received light.

Out of the plurality of light receivers 51, the light receivers 51 disposed so as to face the second filter regions 31B receive the light having passed through the variable wavelength interference filter 2 and the second filter regions 31B and each output a light reception signal according to the optical intensity of the received light.

The signal processing section 6 in FIG. 1 performs amplification and analog-to-digital conversion on the light reception signals inputted from the plurality of light receivers 51 and outputs the processed light reception signals to the controller 102. The signal processing section 6 is formed of an amplifier that amplifies the light reception signals, an A/D converter that converts an analog signal into a digital signal, and other components.

Spectral Dispersion Performed by Optical Filter 1

In the present embodiment, the plurality of transmission peak wavelengths $\lambda 1$ and $\lambda 2$ of the variable wavelength interference filter 2 correspond to the transmission wavelength segments of the plurality of filter regions 31A and 31B (first target wavelength segment R1, second target wavelength segment R2), respectively.

That is, in the present embodiment, the first transmission peak wavelength $\lambda 1$ corresponds to the first target wavelength segment R1, which is the transmission wavelength segment of the first filter regions 31A, and the second transmission peak wavelength $\lambda 2$ corresponds to the second target wavelength segment R2, which is the transmission wavelength segment of the second filter regions 31B.

The spectral dispersion performed by the optical filter 1 will be specifically described below.

Figure 6:
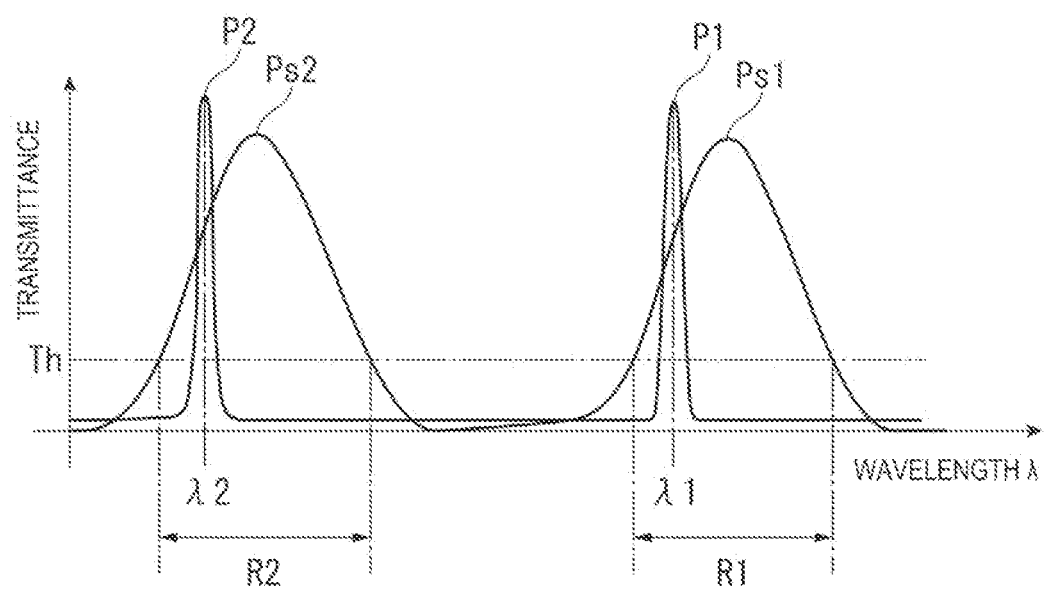
FIG. 6 shows graphs illustrating the transmission wavelength characteristics of the variable wavelength interference filter and the fixed wavelength filter in the first embodiment.

FIG. 6 shows graphs illustrating both the transmission wavelength characteristic of the variable wavelength interference filter 2 with the gap dimension D controlled to be a predetermined dimension and the transmission wavelength characteristic of the fixed wavelength filter 3.

The first transmission peak wavelength $\lambda 1$ of the variable wavelength interference filter 2 overlaps with the first target wavelength segment R1 of the first filter regions 31A, and the second transmission peak wavelength $\lambda 2$ of the variable wavelength interference filter 2 overlaps with the second target wavelength segment R2 of the second filter regions 31B, as shown in FIG. 6.

That is, the first filter regions 31A transmit light having the first transmission peak wavelength $\lambda 1$ and blocks light having the second transmission peak wavelength $\lambda 2$ out of the light passing through the variable wavelength interference filter 2. On the other hand, the second filter regions 31B transmit the light having the second transmission peak wavelength $\lambda 2$ and blocks the light having the first transmission peak wavelength $\lambda 1$ out of the light passing through the variable wavelength interference filter 2.

The light having the first transmission peak wavelength $\lambda 1$ resulting from the spectral dispersion performed by the optical filter 1 thus passes through the first filter regions 31A and is received by the light receivers 51 disposed so as to face the first filter regions 31A. The light having the second transmission peak wavelength $\lambda 2$ resulting from the spectral dispersion performed by the optical filter 1 passes through the second filter regions 31B and is received by the light receivers 51 disposed so as to face the second filter regions 31B.

Figure 7:
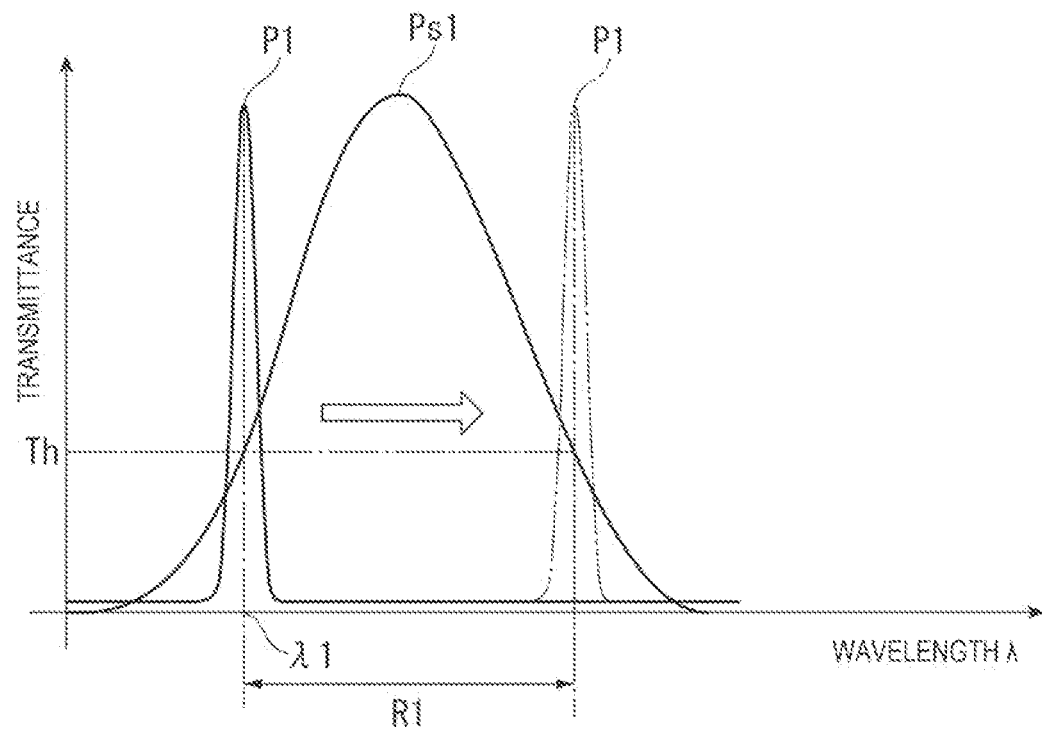
FIG. 7 shows graphs illustrating how a transmission peak wavelength of the variable wavelength interference filter in the first embodiment changes.

When the gap dimension D in the variable wavelength interference filter 2 is changed within a predetermined range, the first transmission peak wavelength $\lambda 1$ changes within the first target wavelength segment R1 of the first filter regions 31A, as shown in FIG. 7. Similarly, the second transmission peak wavelength $\lambda 2$ changes within the second target wavelength segment R2 of the second filter regions 31B.

In FIG. 7, the arrow indicating the change in the first transmission peak wavelength $\lambda 1$ points in the direction in which the wavelength increases, but the direction in which the wavelength changes can be either the direction in which the wavelength increases or decreases.

Configuration of Controller 102

The controller 102 of the spectral measurement apparatus 100 will next be described with reference to FIG. 1 again.

The controller 102 is formed, for example, of the combination of a CPU (central processing unit), a memory, and other components and controls the overall operation of the spectral measurement apparatus 100. The controller 102 includes a processor 7 and a storage 8, as shown in FIG. 1.

The storage 8 stores a variety of programs and data for controlling the spectral measurement apparatus 100. For example, the storage 8 stores a drive table that associates target values of the gap dimension D, the first transmission peak wavelength λ1, and the second transmission peak wavelength λ2 with one another. An initial drive voltage corresponding to each of the target values of the gap dimension D may also be recorded in the drive table.

The processor 7 functions as a filter control section 71, a light quantity acquisition section 72, and a spectral measurement section 73 by reading and executing the programs stored in the storage 8.

The filter control section 71 controls the drive circuit 4 based on each of the target values of the gap dimension D. Specifically, the filter control section 71 successively outputs command values corresponding to the target values of the gap dimension D to the drive circuit 4.

When initial drives voltage corresponding to the target values of gap dimension D is recorded in the drive table, the command values may be the initial drive voltages.

The light quantity acquisition section 72 controls the light receiving unit 5 and acquires the light reception signals outputted from the light receiving unit 5 via the signal processing section 6.

The spectral measurement section 73 can measure an optical spectrum of the measurement target object X by measuring the spectral characteristic of the light having passed through the optical filter 1 based on the data acquired by the light quantity acquisition section 72. For example, the spectral measurement section 73 may perform an analysis process of analyzing the components contained in the measurement target object X and the contents of the components based on the optical spectrum.

Setting Target Value of Gap Dimension D

How to set the target values of the gap dimension D will next be described next.

Figure 8:
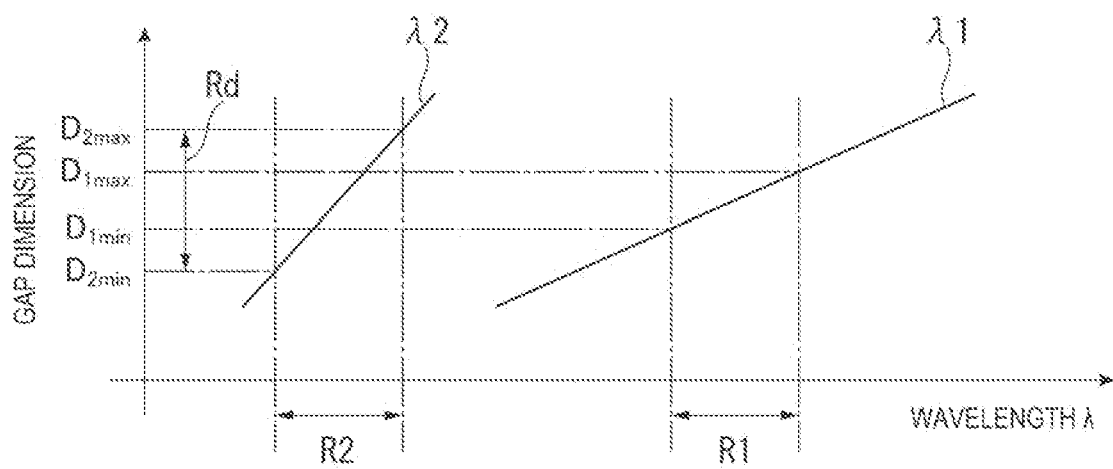
FIG. 8 shows graphs illustrating an example of the relationship of the dimension of the gap in the variable wavelength interference filter in the first embodiment and each transmission peak wavelength thereof.

FIG. 8 shows graphs illustrating an example of the relationship of each of the first transmission peak wavelength λ1 and the second transmission peak wavelength λ2 with the gap dimension D.

The rate of change in the first transmission peak wavelength λ1 with respect to a change in the gap dimension D differs from the rate of change in the second transmission peak wavelength λ2 with respect to the change in gap dimension D, as shown in FIG. 8. The range from $D_{1min}$ to $D_{1max}$ in the gap dimension D, in which the first transmission peak wavelength λ1 overlaps with the first target wavelength segment R1, does not fully coincide with but partly differs from the range from $D_{2min}$ to $D_{2max}$ in the gap dimension D, in which the second transmission peak wavelength λ2 overlaps with the second target wavelength segment R2.

In view of the fact described above, in the present embodiment, a maximum range where at least one of the first transmission peak wavelength λ1 and the second transmission peak wavelength λ2 overlaps with the corresponding transmission wavelength segment (first target wavelength segment R1 or second target wavelength segment R2) is set as a scanning range for the gap dimension D (gap scanning range).

Specifically, the gap dimension D that is the smallest one of the lower limits $D_{1min}$ and $D_{2min}$ of the ranges from $D_{1min}$ to $D_{1max}$ and from $D_{2min}$ to $D_{2max}$ of the gap dimension D described above is defined as a minimum gap dimension $D_{imin}$. The gap dimension D that is the greatest one of the upper limits $D_{1max}$ and $D_{2max}$ of the ranges from $D_{1min}$ to $D_{1max}$ and from $D_{2min}$ to $D_{2max}$ of the gap dimension D described above is defined as a maximum gap dimension $D_{imax}$. The range from the minimum gap dimension $D_{imin}$ to the maximum gap dimension $D_{imax}$ is then set as a gap scanning range Rd (scanning range setting step).

In the example shown in FIG. 8, the minimum gap dimension $D_{imin}$ is the gap dimension $D_{2min}$, the maximum gap dimension $D_{imax}$ is the gap dimension $D_{2max}$, and the gap scanning range Rd ranges from $D_{2min}$ to $D_{2max}$.

Each target value of the gap dimension D is then set within the gap scanning range Rd set as described above (target value setting step).

The interval between the target values of the gap dimension D, that is, the width of change in the gap dimension D, can be arbitrarily set.

For example, the width of change may be set by dividing the gap scanning range Rd into sub-ranges at equal intervals. Instead, the width of change in the gap dimension D may be set so that the first transmission peak wavelength λ1 or the second transmission peak wavelength λ2 is changed by a predetermined wavelength width.

The target values of the gap dimension D are thus set. First transmission peak wavelengths λ1 and second transmission peak wavelengths λ2 corresponding to the target values of the gap dimension D are stored in the drive table.

The gap scanning range Rd in the present embodiment includes the range corresponding to a wavelength segment outside the first target wavelength segment R1. In the range described above, the first transmission peak wavelength λ1 does not fall within the transmission wavelength segment of the first filter regions 31A. Information stating that the target value of the gap dimension D that falls within the range described above does not allow normal-range detection of light having the first transmission peak wavelength λ1 may therefore be recorded in the drive table.

Spectral Measurement Method Using Spectral Measurement Apparatus 100

A spectral measurement method using the spectral measurement apparatus 100 according to the present embodiment will next be described.

In the following description, there are n target values of the gap dimension D, and the gap dimension D is changed from D1 to Dn. The subscript "i" in Di is a variable for identifying the gap dimension D. The target values D1 through Dn of the gap dimensions D differ from one another.

Figure 9:
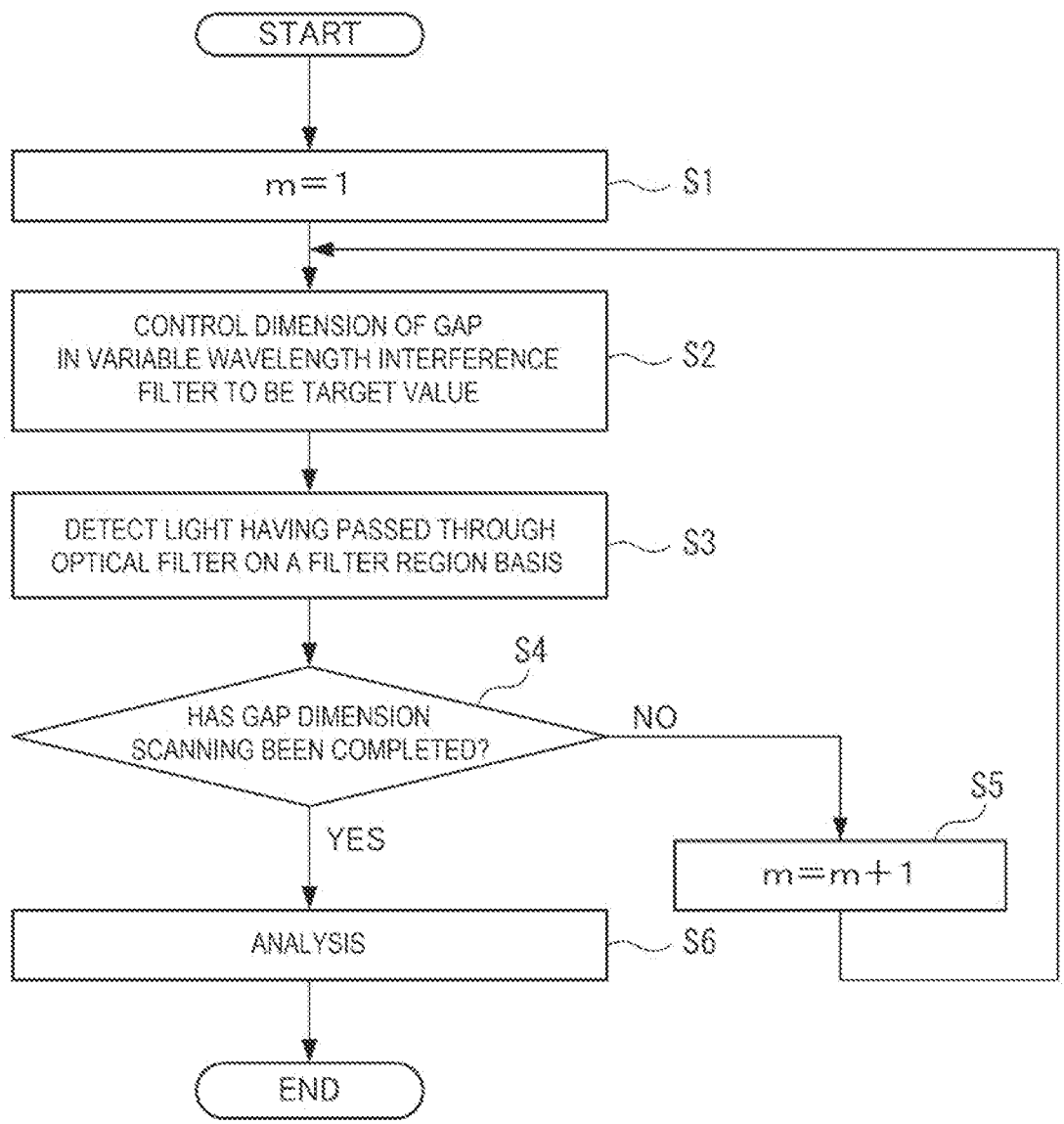
FIG. 9 is a flowchart showing a spectral measurement method according to the first embodiment.

FIG. 9 is a flowchart showing the spectral measurement method using the spectral measurement apparatus 100 according to the present embodiment.

In the spectral measurement apparatus 100, when a user inputs an instruction to start a spectral measurement process, the filter control section 71 initializes a measurement variable m, which represents the number of measurement times, to set the measurement variable m at 1 (step S1).

The filter control section 71 then inputs a command signal corresponding to a target value Dm of the gap dimension D to the drive circuit 4 (step S2). The drive circuit 4 then applies a drive voltage corresponding to the target value Dm to the electrostatic actuator 25 to control the electrostatic actuator 25 in such a way that the gap dimension D in the variable wavelength interference filter 2 becomes the target value Dm.

As a result, out of the light reflected off the measurement target object X and incident on the optical filter 1, light having wavelength characteristic corresponding to the target value Dm of the gap dimension D passes through the optical filter 1 and is received by the light receiving unit 5.

That is, in the light receiving unit 5, light having a first target wavelength and having passed through the variable wavelength interference filter 2 and the first filter regions 31A, and light having a second target wavelength and having passed through the variable wavelength interference filter 2 and the second filter regions 31B, are each received by the corresponding light receivers 51.

The light quantity acquisition section 72 then acquires the light reception signals inputted from the light receivers 51 via the signal processing section 6. The light having the first target wavelength and having passed through the variable wavelength interference filter 2 and the first filter regions 31A, and the light having the second target wavelength and having passed through the variable wavelength interference filter 2 and the second filter regions 31B, are thus detected (step S3; detection step).

Specifically, the light quantity acquiring section 72 associates the values of the light reception signals acquired from the light receivers 51 facing the first filter regions 31A (first light reception signal values) with the first transmission peak wavelength $\lambda 1$ corresponding to the target value of the gap dimension D, and stores the values associated with the wavelength in the storage 8. The light quantity acquisition section 72 further associates the values of the light reception signals acquired from the light receivers 51 facing the second filter regions 31B (second light reception signal values) with the second transmission peak wavelength $\lambda 2$ corresponding to the target value of the gap dimension D and stores the values associated the wavelength in the storage 8.

In the present embodiment, since there are two light receivers 51 corresponding to the first filter regions 31A, two first light reception signal values are acquired. The light quantity acquisition section 72 may calculate the average of the two first light reception signal values and store the average or may store the two values as separate data. The same applies to the second light reception signal values.

The spectral measurement section 73 then evaluates whether or not the first and second light reception signals have been acquired for all the target values D1 to Dn of the gap dimension D, that is, whether or not the scanning of the gap dimension D has been completed (step S4).

When the result of the evaluation in step S4 is NO, the filter control section 71 adds one to the measurement variable m (step S5) and returns to step S2. Steps S2, S4, and S5 correspond to a scanning step of changing the gap dimension at predetermined intervals.

When the result of the evaluation in step S4 is YES, the optical intensities at the plurality of target wavelengths of the measurement target light are analyzed based on the data obtained in step S3, and an optical spectrum is thus acquired (step S6).

The spectral measurement section 73 further uses the transmittance of each of the light having the first transmission peak wavelength $\lambda 1$ and the light having the second transmission peak wavelength $\lambda 2$ passing through the variable wavelength interference filter 2, the transmittance of the light having the first transmission peak wavelength $\lambda 1$ passing through the first filter regions 31A, and the transmittance of the light having the second transmission peak wavelength $\lambda 2$ passing through the second filter regions 31B, to correct the differences in transmittance provided by the optical filter 1 among the target wavelengths. Information on the transmittance may be stored in the storage 8 in advance.

The spectral measurement section 73 may carry out an interpolation process of interpolating data corresponding to an arbitrary gap dimension D between the plurality of target values based on the data obtained in step S3 (interpolation step). The interpolation is, for example, linear interpolation or spline interpolation.

The flowchart in FIG. 9 is thus completed.

Effects of First Embodiment

The optical filter 1 according to the present embodiment includes the variable wavelength interference filter 2, which includes the pair of reflection films 23A and 23B and has a plurality of transmission peak wavelengths (first transmission peak wavelength $\lambda 1$, second transmission peak wavelength $\lambda 2$) according to the gap dimension D between the pair of reflection films 23A and 23B, and the fixed wavelength filter 3, which is disposed so as to face the variable wavelength interference filter 2 and having the plurality of filter regions 31 (first filter regions 31A, second filter regions 31B) different from one another in transmission wavelength segment.

The first transmission peak wavelength $\lambda 1$ of the variable wavelength interference filter 2 corresponds to the transmission wavelength segment of the first filter regions 31A, and the second transmission peak wavelength $\lambda 2$ of the variable wavelength interference filter 2 corresponds to the transmission wavelength segment of the second filter regions 31B.

The first transmission peak wavelength $\lambda 1$ of the variable wavelength interference filter 2 changes within the transmission wavelength segment of the corresponding first filter regions 31A (first target wavelength segment R1) in accordance with a change in the gap dimension D. The second transmission peak wavelength $\lambda 2$ of the variable wavelength interference filter 2 changes within the transmission wavelength segment of the corresponding second filter regions 31B (second target wavelength segment R2) in accordance with a change in the gap dimension D.

In the optical filter 1 according to the present embodiment, the light having passed through the variable wavelength interference filter 2, that is, the light having the first transmission peak wavelength $\lambda 1$ and the light having the second transmission peak wavelength $\lambda 2$ separately exit out of the first filter regions 31A and the second filter regions 31B, respectively. Using the optical filter 1 according to the present embodiment therefore allows simultaneous and separate detection of the light having the first transmission peak wavelength $\lambda 1$ and the light having the second transmission peak wavelength $\lambda 2$ both passing through the optical filter 1. That is, performing spectral measurement by using the optical filter 1 according to the present embodiment allows the optical intensities at two target wavelengths to be simultaneously detected whenever the gap dimension D in the variable wavelength interference filter 2 is changed. The number of steps of changing the gap dimension D can thus be reduced, resulting in a reduction in the measurement period.

Furthermore, the optical filter 1 according to the present embodiment allows the measurement period to be effectively shortened when the number of target wavelengths is large, such as when a spectral characteristic is measured over a wide bandwidth or when a high-precision spectral characteristic is measured by narrowing the width of change in the gap dimension D in the variable wavelength interference filter 2.

The spectrometric module 101 according to the present embodiment includes the optical filter 1 described above and the plurality of light receivers 51, which are disposed so as to face the filter regions 31 in the fixed wavelength filter 3. The light receivers 51 receive the light having passed through the variable wavelength interference filter 2 and the filter regions 31 disposed so as to face the light receivers 51, and each output a light reception signal according to the optical intensity of the received light.

The thus configured spectrometric module 101 provides the effect of suitable detection of light having the wavelengths and having passed through the variable wavelength interference filter 2, the same effect described with reference to the optical filter 1 described above.

The spectral measurement method according to the present embodiment is a method using the optical filter 1 described above and includes (i) the scanning step of changing the gap dimension D at predetermined intervals in such a way that the first transmission peak wavelength $\lambda 1$ of the variable wavelength interference filter 2 changes within the corresponding first target wavelength segment R1 of the first filter regions 31A, and the second transmission peak wavelength $\lambda 2$ of the variable wavelength interference filter 2 changes within the corresponding second target wavelength segment R2 of the second filter regions 31B, and (ii) the detection step of detecting the light having passed through the variable wavelength interference filter 2 and the first filter regions 31A, and the light having passed through the variable wavelength interference filter 2 and the second filter regions 31B during the scanning process.

The spectral measurement method described above can provide the same effects as those described with reference to the optical filter 1 described above.

The spectral measurement method according to the present embodiment further includes the scanning range setting step of setting the gap scanning range Rd, which is the range over which the gap dimension D is changed in the scanning process. The gap scanning range Rd is set to the maximum range of the gap dimension D in which at least one of the transmission peak wavelengths (first transmission peak wavelength $\lambda 1$, second transmission peak wavelength $\lambda 2$) of the variable wavelength interference filter 2 overlaps with the corresponding transmission wavelength segment (first target wavelength segment R1 or second target wavelength segment R2).

The thus configured spectral measurement method allows preferable use of the transmission wavelength segment of each of the filter regions 31 and allows spectral measurement to be performed over a wider wavelength range.

The spectral measurement method according to the present embodiment further includes the target value setting step of setting a plurality of target values of the gap dimension D at predetermined intervals within the gap scanning range Rd, and the gap dimension D is sequentially changed to the plurality of target values in the scanning step.

The thus configured spectral measurement method allows the scanning step to be preferably carried out. The predetermined intervals, that is, the width of change in the gap dimension D may be set by dividing the gap scanning range Rd into equal sub-ranges or may be set by changing an arbitrary transmission peak wavelength (first transmission peak wavelength $\lambda 1$ or second transmission peak wavelength $\lambda 2$) of the variable wavelength interference filter 2 by a predetermined wavelength width, as described above.

The spectral measurement method according to the present embodiment further includes the interpolation step of interpolating data corresponding to an arbitrary gap dimension D between the plurality of target values based on the data obtained in the detection step.

The rate of change in the first transmission peak wavelength $\lambda 1$ with respect to a change in the gap dimension D differs from the rate of change in the second transmission peak wavelength $\lambda 2$ with respect to the change in gap dimension D. The interpolation step in the present embodiment can suppress variation in measured data due to the difference between the width of change in the first transmission peak wavelength $\lambda 1$ and the width of change in the second transmission peak wavelength $\lambda 2$.

Second Embodiment

A second embodiment of the present disclosure will be described.

A spectral measurement apparatus 100A according to the second embodiment has basically the same configuration as that of the spectral measurement apparatus 100 according to the first embodiment, as shown in FIG. 1. Configurations different from those in the first embodiment will be described below, and the same configurations as those in the first embodiment have the same reference characters as those in the first embodiment and will not be described or described in a simplified manner.

The optical filter 1A according to the second embodiment includes a variable wavelength interference filter 2A and a fixed wavelength filter 3A, as shown in FIG. 1. Unlike the first embodiment, the optical filter 1A is configured to transmit light having four wavelengths.

Figure 10:
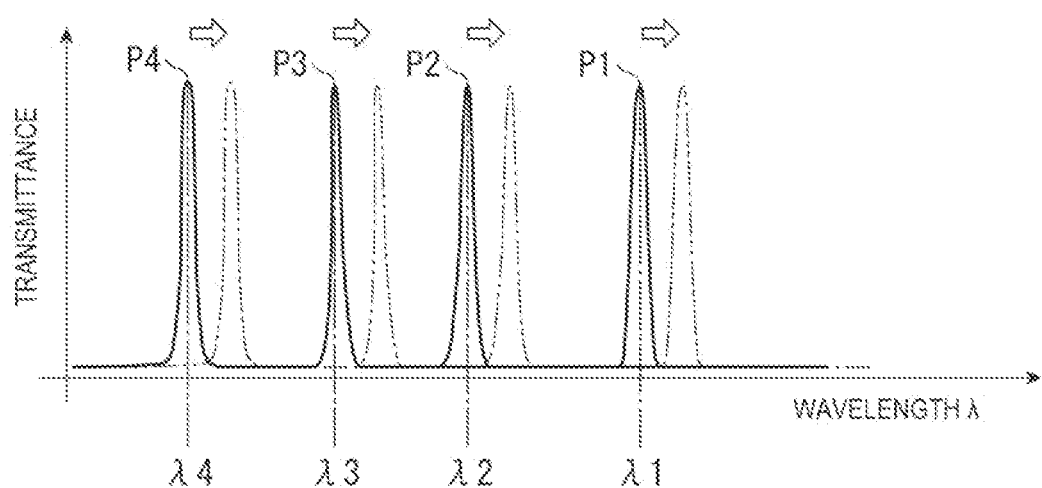
FIG. 10 shows a graph illustrating the transmission wavelength characteristic of the variable wavelength interference filter in a second embodiment.

Specifically, the transmission wavelength characteristic of the variable wavelength interference filter 2A have four peaks P1 to P4, as shown in FIG. 10. That is, the variable wavelength interference filter 2A can transmit light having peak wavelengths $\lambda 1$ to $\lambda 4$ and therearound in such a way that the transmitted light has high wavelength resolution.

The configuration of the variable wavelength interference filter 2A is the same as that in the first embodiment. The transmission wavelength characteristic of the variable wavelength interference filter 2A can be achieved by adjusting the thickness of the metal film or the dielectric multilayer film that forms each of the reflection films 23A and 23B (see FIG. 2) or the number of layers of each of the metal film or the dielectric multilayer film.

Figure 11:
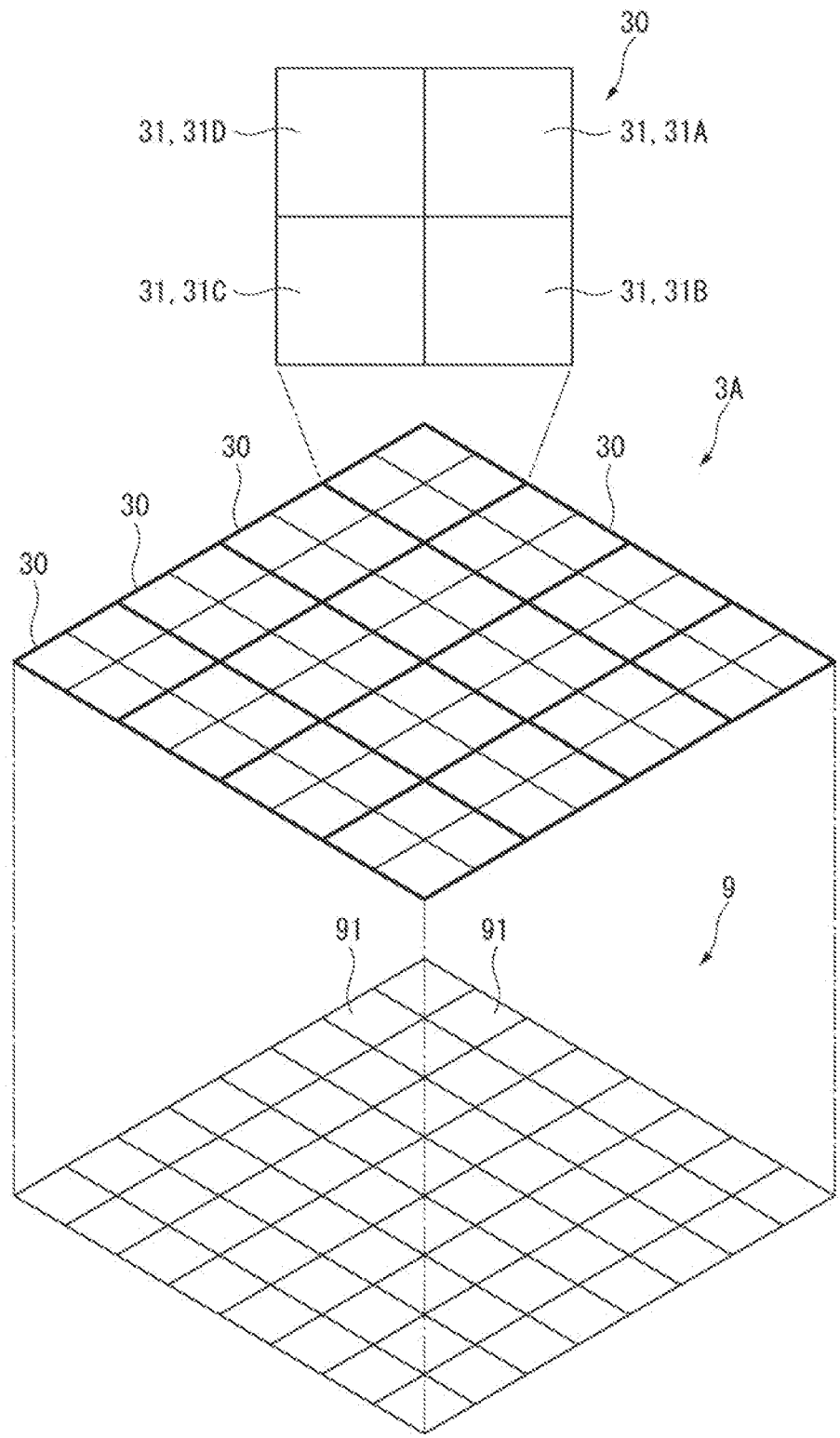
FIG. 11 diagrammatically shows the fixed wavelength filter and the light receiving unit in the second embodiment.

The fixed wavelength filter 3A includes a plurality of filter units 30 arranged in an array, as shown in FIG. 11. The filter units 30 each have a plurality of filter regions 31, which differ from one another in transmission wavelength segment. Specifically, the filter units 30 in the present embodiment each have a first filter region 31A, a second filter region 31B, a third filter region 31C, and a fourth filter region 31D as the plurality of filter regions 31, which differ from one another in transmission wavelength segment.

FIG. 11 shows an example in which two filter regions in the horizontal direction and two filter regions in the vertical direction, four filter regions 31 in total are disposed in each of the filter units 30, and the four filter regions 31 differ from one another in transmission wavelength segment. It is, however, noted that the arrangement of the filter regions 31, the number of transmission wavelength segments of the filter regions 31, and the number of filter regions 31 per transmission wavelength segment in each of the filter units 30 are not limited to those described above.

Figure 12:
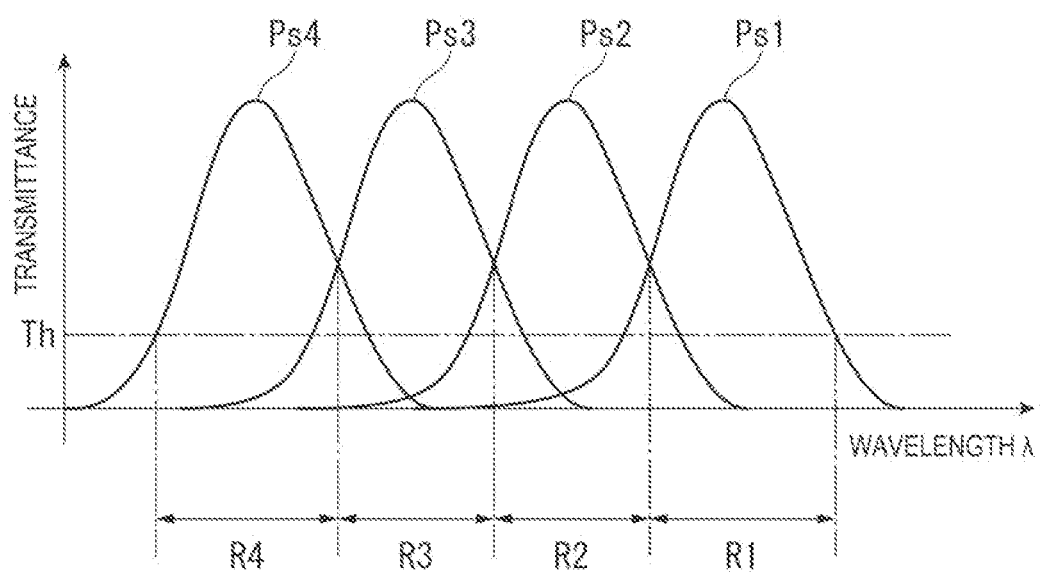
FIG. 12 shows a graph illustrating the transmission wavelength characteristic of the fixed wavelength filter in the second embodiment.

FIG. 12 shows a graph illustrating the transmission wavelength characteristic of the fixed wavelength filter 3A in the second embodiment. The transmission wavelength characteristic of the fixed wavelength filter 3A has a peak Ps1 corresponding to the first filter region 31A, a peak Ps2 corresponding to the second filter region 31B, a peak Ps3 corresponding to the third filter region 31C, and a peak Ps4 corresponding to the fourth filter region 31D, as shown in FIG. 12.

In the present embodiment, the transmission wavelength segments of the first filter region 31A to the fourth filter region 31D are each a wavelength segment in which the wavelength at the corresponding one of the peaks Ps1 to Ps4 is a transmission center wavelength and the transmittance is greater than or equal to a predetermined value Th.

In the present embodiment, a first target wavelength segment R1 is set within the transmission wavelength segment of the first filter region 31A, a second target wavelength segment R2 is set within the transmission wavelength segment of the second filter region 31B, a third target wavelength segment R3 is set within the transmission wavelength segment of the third filter region 31C, and a fourth target wavelength segment R4 is set within the transmission wavelength segment of the fourth filter region 31D. The first target wavelength segment R1 to the fourth target wavelength segment R4 are set so as not to overlap with each other.

In the present embodiment, for example, the first target wavelength segment R1 is a near-infrared light region, the second target wavelength segment R2 is a red light region, the third target wavelength segment R3 is a green light region, and the fourth target wavelength segment R4 is a blue light region.

Therefore, for example, a near-infrared light transmitting filter can be used as the first filter region 31A, and color filters can be used as the second filter region 31B to the fourth filter region 31D.

In the optical filter 1A according to the second embodiment described above, the relationship shown in FIG. 13 is achieved by a predetermined gap dimension D. Specifically, the first transmission peak wavelength $\lambda 1$ of the variable wavelength interference filter 2A overlaps with the first target wavelength segment R1 of the first filter region 31A. The second transmission peak wavelength $\lambda 2$ of the variable wavelength interference filter 2A overlaps with the second target wavelength segment R2 of the second filter region 31B. The third transmission peak wavelength $\lambda 3$ of the variable wavelength interference filter 2A overlaps with the third target wavelength segment R3 of the third filter region 31C. The fourth transmission peak wavelength $\lambda 4$ of the variable wavelength interference filter 2A overlaps with the fourth target wavelength segment R4 of the fourth filter region 31D.

That is, the first filter region 31A transmits the light having the first transmission peak wavelength $\lambda 1$ and prevents the light having the other wavelengths from passing through the first filter region 31A, or suppresses the amount of light passing therethrough out of the light passing through the variable wavelength interference filter 2A. The second filter region 31B transmits the light having the second transmission peak wavelength $\lambda 2$ and prevents the light having the other wavelengths from passing through the second filter region 31B, or suppresses the amount of light passing therethrough out of the light passing through the variable wavelength interference filter 2A. The third filter region 31C transmits the light having the third transmission peak wavelength $\lambda 3$ and prevents the light having the other wavelengths from passing through the third filter region 31C, or suppresses the amount of light passing therethrough out of the light passing through the variable wavelength interference filter 2A. The fourth filter region 31D transmits the light having the fourth transmission peak wavelength $\lambda 4$ and prevents the light having the other wavelengths from passing through the fourth filter region 31D, or suppresses the amount of light passing therethrough out of the light passing through the variable wavelength interference filter 2A.

In the second embodiment, however, the transmission wavelength segments overlap with each other among the first filter region 31A to the fourth filter region 31D.

Figure 13:
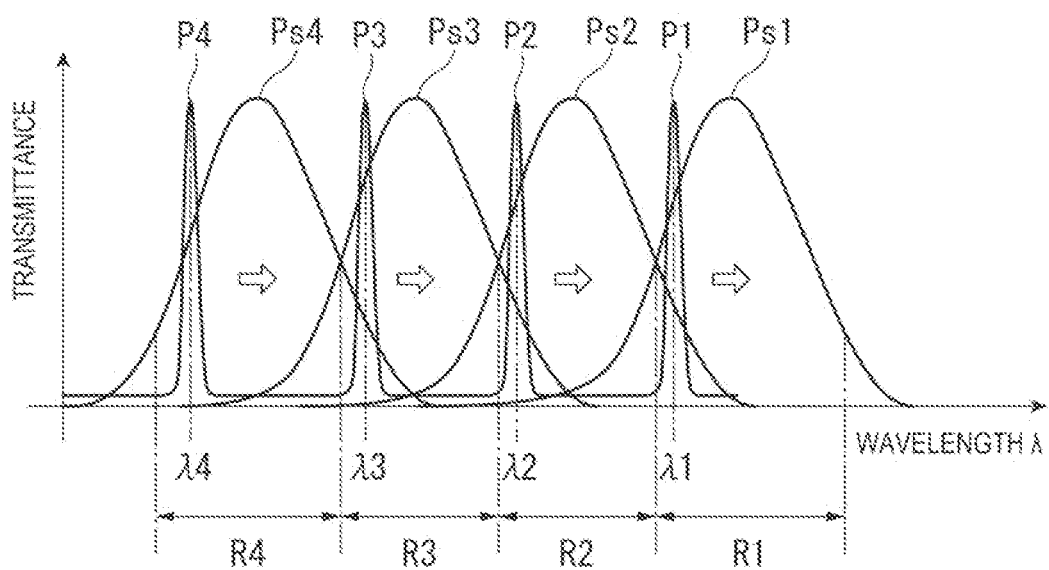
FIG. 13 shows graphs illustrating the transmission wavelength characteristics of the variable wavelength interference filter and the fixed wavelength filter in the second embodiment.

For example, the transmission wavelength segment of the first filter region 31A overlaps with the transmission wavelength segment of the second filter region 31B, as shown in FIG. 13. Therefore, not only the first transmission peak wavelength $\lambda 1$ but also the second transmission peak wavelength $\lambda 2$ may overlap with the transmission wavelength segment of the first filter region 31A. That is, the first filter region 31A may transmit not only the light having the corresponding first transmission peak wavelength $\lambda 1$ but also, although slightly, the light having the second transmission peak wavelength $\lambda 2$ in some cases. The same holds true for the second filter region 31B to the fourth filter region 31D.

Therefore, in the second embodiment, the spectral measurement section 73 excludes from each light reception signal value a value resulting from a transmission peak wavelength other than the corresponding transmission peak wavelength, as will be described below.

The spectrometric module 101A according to the second embodiment includes an imaging device 9 in place of the light receiving unit 5 in the first embodiment, as shown in FIG. 11. That is, the spectrometric module 101A according to the second embodiment functions as a spectrometric camera.

The imaging device 9 has a plurality of pixels 91, which are disposed so as to face the filter regions 31. The pixels 91 receive the light having passed through the variable wavelength interference filter 2 and the filter regions 31 facing the pixels 91, and each output a light reception signal according to the optical intensity of the received light.

A CMOS image sensor can, for example, be used as the imaging device 9.

The light reception signals outputted from the imaging device 9 are inputted to the controller 102 via the signal processing section 6, as in the first embodiment.

The controller 102 in the second embodiment has the same configuration as that in the first embodiment.

For example, the filter control section 71 controls the drive circuit 4 based on each target value of the gap dimension D, as shown in FIG. 1.

The light quantity acquisition section 72 controls the imaging device 9 to acquire the light reception signals outputted from the imaging device 9 via the signal processing section 6, associates the light reception signals with the corresponding first transmission peak wavelength $\lambda 1$ to fourth transmission peak wavelength $\lambda 4$, and stores the associated data in the storage 8.

The spectral measurement section 73 measures the spectral characteristic of the light having passed through the optical filter 1 based on the data acquired by the light quantity acquisition section 72.

The spectral measurement section 73 excludes from each of the acquired light reception signal values a value resulting from a transmission peak wavelength other than the corresponding transmission peak wavelength, as described above.

In the second embodiment, how to set the target values of the gap dimension D is substantially the same as that in the first embodiment.

For example, the following ranges are determined: a range from $D_{1min}$ to $D_{1max}$ of the gap dimension D, in which the first transmission peak wavelength λ1 overlaps with the first target wavelength segment R1; a range from $D_{2min}$ to $D_{2max}$ of the gap dimension D, in which the second transmission peak wavelength λ2 overlaps with the second target wavelength segment R2; a range from $D_{3min}$ to $D_{3max}$ of the gap dimension D, in which the third transmission peak wavelength λ3 overlaps with the third target wavelength segment R3; and a range from $D_{1min}$ to $D_{4max}$ of the gap dimension D, in which the fourth transmission peak wavelength λ4 overlaps with the fourth target wavelength segment R4. The smallest of the lower limits $D_{1min}$, $D_{2min}$, $D_{3min}$, and $D_{4min}$ of the aforementioned ranges of the gap dimension D is defined as a minimum gap dimension $D_{imin}$. The greatest of the upper limits $D_{1max}$, $D_{2max}$, $D_{1max}$, and $D_{4max}$ of the aforementioned ranges of the gap dimension D is defined as a maximum gap dimension $D_{imax}$. The range from the minimum gap dimension $D_{imin}$ to the maximum gap dimension $D_{imax}$ is then set as the gap scanning range Rd, and a plurality of target values are set in the gap scanning range Rd at predetermined intervals.

The spectral measurement method using the spectral measurement apparatus 100A according to the second embodiment can be implemented in substantially the same manner as in the first embodiment.

In the spectral measurement apparatus 100A according to the second embodiment, in the analysis in step S6 described above, a data set that is the combination of data acquired from the pixels 91 corresponding to the filter regions 31 of each of the filter units 30 is generated, and the data sets are each assigned to each pixel of the spectral image. The spectral image of the measurement target object X can thus be acquired.

Effects of Second Embodiment

The optical filter 1A and spectrometric module 101A according to the second embodiment provide the same effects as those in the first embodiment.

In the optical filter 1A according to the second embodiment, the fixed wavelength filter 3A includes the plurality of filter units 30 arranged in an array, and the filter units 30 each have the plurality of filter regions 31 (first filter region 31A, second filter region 31B, third filter region 31C, and the fourth filter region 31D).

In the configuration described above, light having wavelengths λ1 to λ4 and having passed through the variable wavelength interference filter 2A exits out of each of the filter units 30. Using the optical filter 1A according to the second embodiment therefore allows preferable acquisition of an optical spectrum for each portion of the measurement target object X.

The spectrometric module 101A according to the second embodiment further includes the imaging device 9 having the pixels 91, which function as the light receivers 51 in the first embodiment.

The thus configured spectrometric module 101A can preferably detect light having the wavelengths λ1 to λ4 and having passed through the variable wavelength interference filter 2A. Furthermore, a spectral image of the measurement target object X can be acquired, as described above.

Variations

The present disclosure is not limited to the embodiments described above, and variations, improvements, and other modifications to the extent that the advantage of the present disclosure is achieved fall within the scope of the present disclosure.

In each of the embodiments described above, other methods may be used to set the target values of the gap dimension D.

For example, in the description of the aforementioned first embodiment, the rate of change in the first transmission peak wavelength λ1 with respect to a change in the gap dimension D differs from the rate of change in the second transmission peak wavelength λ2 with respect to the change in the gap dimension D, but the rates of change may be equal to each other. In this case, arbitrarily one of the first transmission peak wavelength λ1 and the second transmission peak wavelength λ2 may be set as a transmission peak wavelength of interest, and the transmission wavelength segment of the filter regions 31 corresponding to the wavelength of interest can be set as the target wavelength segment. The range of change in the gap dimension D that changes when the target wavelength segment is scanned is defined as the gap scanning range Rd, and each target value can be set within the gap scanning range Rd.

In the description of the aforementioned embodiments, each transmission peak wavelength of each of the variable wavelength interference filters 2 and 2A scans the corresponding target wavelength segment, but each transmission peak wavelength may not scan the entire corresponding target wavelength segment as long as the transmission peak wavelength changes within the target wavelength range.

In the second embodiment described above, the first target wavelength segment R1 to the fourth target wavelength segment R4 are set as wavelength segments that do not overlap with each other in the respective transmission wavelength segments of the first filter region 31A to the fourth filter region 31D, but not necessarily. That is, the first target wavelength segment R1 to the fourth target wavelength segment R4 may be wavelength segments that partially overlap with each other in the respective transmission wavelength segments of the first filter region 31A to the fourth filter region 31D.

For example, a lower-wavelength portion of the first target wavelength segment R1 may overlap with a higher-wavelength portion of the second target wavelength segment R2. In this case, in the wavelength segment where the first target wavelength segment R1 and the second target wavelength segment R2 overlap with each other, the gap dimension D that allows detection of the light having the first transmission peak wavelength λ1 differs from the gap dimension D that allows detection of the light having the second transmission peak wavelength λ2. One of the data sets on the detected light may be used for the analysis, or the average of the data sets may be used for the analysis. One of the data sets on the detected light may be used to interpolate the other data set.

The spectral measurement apparatus 100 according to each of the embodiments described above may be incorporated into an electronic instrument, such as a projector and a printer.

Overview of Present Disclosure

An optical filter according to one aspect of the present disclosure includes a variable wavelength interference filter including a pair of reflection films and having a plurality of transmission peak wavelengths according to the dimension of the gap between the pair of reflection films, and a fixed wavelength filter disposed so as to face the variable wavelength interference filter and having a plurality of filter regions different from one another in transmission wavelength segment. The plurality of transmission peak wavelengths of the variable wavelength interference filter correspond to the transmission wavelength segments of the plurality of filter regions, respectively. The plurality of transmission peak wavelengths of the variable wavelength interference filter each change within the corresponding transmission wavelength segment of the plurality of filter regions in accordance with a change in the gap dimension.

In the configuration described above, light fluxes having the wavelengths and having passed through the variable wavelength interference filter separately exit out of the respective filter regions. Using the optical filter according to the present aspect therefore allows the light fluxes having the wavelengths and having passed through the variable wavelength interference filter to be simultaneously and separately detected. That is, when spectral measurement is performed by using the optical filter according to the present aspect, light fluxes having the plurality of wavelengths can each be detected whenever the dimension of the gap in the variable wavelength interference filter is changed. The number of steps of changing the gap can thus be reduced, resulting in a reduction in the measurement period.

In the optical filter according to the present aspect, the fixed wavelength filter includes a plurality of filter units arranged in an array, and the plurality of filter units each include the plurality of filter regions.

In the configuration described above, the light fluxes having the wavelengths and having passed through the variable wavelength interference filter exit out of each of the filter units. Using the optical filter according to the present aspect therefore allows preferable acquisition of an optical spectrum for each portion of the measurement target object X.

A spectrometric module according to one aspect of the present disclosure includes the optical filter described above and a plurality of light receivers disposed so as to face the plurality of respective filter regions of the fixed wavelength filter, and the plurality of light receivers each receive light having passed through the variable wavelength interference filter and the filter region disposed so as to face the light receiver and output a light reception signal according to the intensity of the received light.

The configuration described above allows preferable acquisition of an optical spectrum for each portion of a measurement target object.

The spectrometric module according to the aspect of the present disclosure further includes an imaging device including the light receivers as the pixels.

The configuration described above allows preferable detection of the light having the wavelengths and having passed through the variable wavelength interference filter. When the fixed wavelength filter includes a plurality of filter units, a data set is generated from data acquired from the plurality of pixels corresponding to each of the filter units, and the data sets are each assigned to each pixel of the spectral image to capture a spectral image of the measurement target object.

A spectral measurement method according to one aspect of the present disclosure is a spectral measurement method using an optical filter. The optical filter includes a variable wavelength interference filter including a pair of reflection films and having a plurality of transmission peak wavelengths according to the dimension of the gap between the pair of reflection films, and a fixed wavelength filter disposed so as to face the variable wavelength interference filter and having a plurality of filter regions different from one another in transmission wavelength segment. The plurality of transmission peak wavelengths of the variable wavelength interference filter correspond to the transmission wavelength segments of the plurality of filter regions, respectively. The method includes (i) a scanning step of changing the gap dimension at predetermined intervals in such a way that the plurality of transmission peak wavelengths of the variable wavelength interference filter each change within the corresponding transmission wavelength segment of the plurality of filter regions, and (ii) a detection step of detecting the light having passed through the variable wavelength interference filter and the fixed wavelength filter for each of the filter regions during the scanning step.

The spectral measurement method described above can provide the same effects as those described with reference to the optical filter described above.

The spectral measurement method according to the present aspect further includes a scanning range setting step of setting a gap scanning range that is a range over which the gap dimension is changed in the scanning step, and the gap scanning range is set to the maximum range of the gap dimension in which at least one of the transmission peak wavelengths of the variable wavelength interference filter overlaps with the corresponding transmission wavelength segment.

The thus configured spectral measurement method allows preferably use of the transmission wavelength segments of the filter regions and therefore allows spectral measurement to be performed over a wider wavelength range.

The spectral measurement method according to the present aspect further includes a target value setting step of setting a plurality of target values of the gap dimension at predetermined intervals within the gap scanning range, and the gap dimension is sequentially changed to the plurality of target values in the scanning step.

The thus configured spectral measurement method allows the scanning step to be preferably carried out.

The spectral measurement method according to the present aspect further includes an interpolation step of interpolating data corresponding to an arbitrary value of the gap dimension between the plurality of target values based on the data obtained in the detection step.

The rate of change in each transmission peak wavelength with respect to a change in gap dimension varies on a transmission peak wavelength basis. The interpolation step in the present aspect can suppress variation in measured data due to the difference in the width of change between transmission peak wavelengths.

What is claimed is:

1. An optical filter comprising:
a variable wavelength interference filter configured to transmit a light, the variable wavelength interference filter including a pair of reflection films and having a plurality of transmission peak wavelengths according to a constant value of a gap dimension between the pair of reflection films, the plurality of transmission peak wavelengths including a first transmission peak wavelength and a second transmission peak wavelength, wherein the variable wavelength interference filter transmits the light having the plurality of transmission peak wavelengths when the gap dimension is constant, and the plurality of transmission peak wavelengths are shifted in accordance with a change in the gap dimension; and a fixed wavelength filter disposed so as to face the variable wavelength interference filter to receive a passed light that is formed by passing the light through the variable wavelength interference filter, the fixed wavelength filter having a plurality of filter regions different from one another in a transmission wavelength range to respectively receive the passed light, the plurality of filter regions including a first filter region and a second filter region, the first filter region transmitting wavelengths only within a first transmission wavelength range, the second filter region transmitting wavelengths only within a second transmission wavelength range different from the first transmission wavelength range, wherein the plurality of transmission peak wavelengths of the variable wavelength interference filter correspond to the plurality of filter regions, respectively, the passed light having the first transmission peak wavelength and the passed light having the second transmission peak wavelength enter into the first and second filter regions, respectively, the first transmission peak wavelength is shifted, in accordance with the change in the dap dimension, only within the first transmission wavelength range, and the second transmission peak wavelength is shifted, in accordance with the change in the dap dimension, only within the second transmission wavelength range.

2. The optical filter according to claim 1, wherein the fixed wavelength filter includes a plurality of filter units arranged in an array, and each of the plurality of filter units includes the plurality of filter regions.

3. A spectrometric module comprising:

the optical filter according to claim 1; and a plurality of light receivers disposed so as to face the plurality of filter regions of the fixed wavelength filter, respectively, wherein the plurality of light receivers each receive light passing through the variable wavelength interference filter and the filter region disposed so as to face the light receiver and output a light reception signal according to an intensity of the received light.

4. The spectrometric module according to claim 3, further comprising an imaging device including the plurality of light receivers as pixels.

5. The optical filter according to claim 1, wherein a full width at half maximum of each of peak wavelengths of the first and the second transmission wavelength ranges of the fixed wavelength filter is wider than a full width at half maximum of each of the first and second transmission peak wavelengths of the variable wavelength interference filter.

* * * * *